(12) United States Patent
Gasparin et al.

(10) Patent No.: US 9,559,554 B2
(45) Date of Patent: Jan. 31, 2017

(54) SPLIT ROTOR STACK GAP WITH A CORNER AIR BARRIER

(71) Applicant: Letrika D.D., Sempeter Pri Gorici (SI)

(72) Inventors: Lovrenc Gasparin, Nova Gorica (SI); Alan Vivic, Solkan (SI)

(73) Assignee: LETRIKA D.D. (SI)

( * ) Notice: Subject to any disclaimer, the term of this patent is extended or adjusted under 35 U.S.C. 154(b) by 0 days.

(21) Appl. No.: 15/111,481

(22) PCT Filed: Dec. 29, 2014

(86) PCT No.: PCT/EP2014/079388
§ 371 (c)(1),
(2) Date: Jul. 13, 2016

(87) PCT Pub. No.: WO2015/106946
PCT Pub. Date: Jul. 23, 2015

(65) Prior Publication Data
US 2016/0336822 A1    Nov. 17, 2016

(30) Foreign Application Priority Data
Jan. 14, 2014 (SI) .................................. 201400016

(51) Int. Cl.
H02K 21/12 (2006.01)
H02K 1/27 (2006.01)
H02K 21/14 (2006.01)

(52) U.S. Cl.
CPC ............ *H02K 1/2706* (2013.01); *H02K 21/14* (2013.01); *H02K 1/276* (2013.01); *H02K 1/2766* (2013.01); *H02K 2213/03* (2013.01)

(58) Field of Classification Search
CPC .............................. H02K 1/276; H02K 1/2766
USPC .......................... 310/156.43, 156.56, 156.57
See application file for complete search history.

(56) References Cited

U.S. PATENT DOCUMENTS

| | | | |
|---|---|---|---|
| 8,957,560 B2* | 2/2015 | Uchiyama | H02K 1/2766 310/156.56 |
| 2009/0026867 A1* | 1/2009 | Haruno | H02K 1/2766 310/156.21 |
| 2010/0181864 A1* | 7/2010 | Miura | |
| 2012/0293033 A1 | 11/2012 | Hisada | |
| 2013/0270958 A1 | 10/2013 | Takahashi et al. | |

FOREIGN PATENT DOCUMENTS

WO    WO-2013098912 A1    7/2013

* cited by examiner

*Primary Examiner* — Hanh Nguyen
(74) *Attorney, Agent, or Firm* — Fishman Stewart PLLC (57) ABSTRACT

A rotor stack of an electric motor may include a gap for insertion of at least two permanent magnets of an individual magnet pole. The gap may include a central connecting element and at least two side connecting elements, which mechanically connect an inner part and an outer part of the rotor stack, so that the at least two side connecting elements define an air barrier having a form of a polygon. The air barrier in an outer corner of the gap may extend to at least two side of a respective one of the at least two permanent magnets. According to an implementation, the respective permanent magnets may be configured as a cuboid.

20 Claims, 8 Drawing Sheets

SPLIT ROTOR STACK GAP WITH A CORNER AIR BARRIER

CROSS-REFERENCE TO RELATED APPLICATIONS

This application claims priority to Slovenian Patent Application No. 201400016, filed Jan. 14, 2014, and International Patent Application No. PCT/EP2014/079388, filed Dec. 29, 2014, both of which are hereby incorporated by reference in their entirety.

TECHNICAL FIELD

The present invention refers to a rotor stack of an electric motor.

The object of invention is a rotor stack air barrier within an electric motor with concentrated winding on the stator stack, which with its form and position contributes to controlled forming of magnetic field of the rotor and consequently, to reduction of the content of a higher harmonic components in the motor induced voltage and reduction of torque oscillation of the motor with inside-placed permanent magnets.

BACKGROUND

There is a lack of technical solution to efficiently reduce the effect of the content of the harmonic components in the motor induced voltage and reduction of the torque oscillation of the motor with inside-placed permanent magnets in the rotor.

In US 2012/0293033 A1 the key deficiency of the exposed solution is shown in the local weakening of the rotor stack laminations, which is caused by the increased volume of the air barrier.

A rotor of the aforementioned kind is known from US 2013/0270958 A1, wherein individual gaps are provided for insertion of a single permanent magnet, wherein the central connecting element creates opposing air barriers with a rounded shape.

SUMMARY

Electric machines and/or electric motors with interior permanent magnets known as IPM are for their generally known advantages well-established in the applications like hybrid-drive vehicles. In the basic concept the IPM electric motor consists of a stator stack (5), manufactured from the laminated sheet metal, which with its form consist of a greater number of teeth, on which excitation windings (4) are made. Similarly, the rotor stack (2) made and/or assembled from the laminated sheet metal, which is placed to the shaft and/or the rotor stack base (1), in which the segments of the assembly make gaps, to which the permanent magnets (3) are put in. Due to striving for the controlled magnetic field, the rotor stack (2) contains formed air barriers, which—with their form—influence the course of the lines of magnetic field in the air barrier between the armature and stator stack (2, 5). The subject of this patent application represents an air barrier of a rotor stack (2), in which an individual gap, to which a permanent magnet (3) is installed, contains only one air barrier, which is placed in an individual corner of the rotor stack gap (2), which directly influences the forming of the magnetic field and in this way reduces the effect of the content of higher harmonic component in the induced voltage of the motor and reduced torque oscillation of the motor with interior permanent magnets. It is important to advise that in the preferred embodiment an individual gap of the magnetic field is divided in two parts, which are separated and/or connected by the central connecting element (2C), which essentially contributes to mechanical stability of the rotor stack (2) in higher rotational speed.

BRIEF DESCRIPTION OF THE DRAWINGS

A detailed description of the invention is presented hereinafter including description of the drawings of the preferred embodiment of the technical solution.

FIG. 1 further shows the extent of the detailed view A.

FIG. 2 shows the marked: the rotor (1), rotor stack (2), side connecting elements (2SA and 2SB), central connecting element (2C), half of the polarized permanent magnet (3A and 3B), winding (4) and a stator stack (5).

FIG. 3 further shows the plane of the central connecting element (RAC) and the plane of the side connecting element (RAS) and extent of a detailed B view.

FIG. 6 shows the marked: rotor stack (2), side connecting element (2SB), central connecting element (2C), one of the pair of magnets (3B), central connecting element plane (RAC), side connecting element plane (RAS), circumference of the first contact point area (J1PA) and radius of the magnet corner rounding (RM).

FIG. 8 shows the marked: first segment of the rotor stack (S1-2), plane of the central connecting element of the first rotor stack segment (RAC-S1), plane of the central connecting element of the second rotor stack segment (RAC-S2), randomly marked magnet in the first rotor stack segment (S1-3) and its pair and/or magnet in the second rotor stack segment (S2-3), in which the first and the second segment of the rotor stack (S1-2, S2-2) and the plane of the central connecting element of the first segment of the rotor stack (RAC-S1) and the plane of the central connecting element of the second segment of the rotor stack (RAC-S2) are misaligned by the misalignment angle (Δ) around the central axis.

DETAILED DESCRIPTION

An expert from the discussed field is expected to be acquainted with constructional and technological characteristics of synchronous motors with interior permanent magnets, therefore the description and explanation hereinafter focuses on the main object of the patent application, i.e. the gap, to which the permanent magnets are installed (3A, 3B) and the belonging air barrier of the rotor stack (2).

Figure 1:
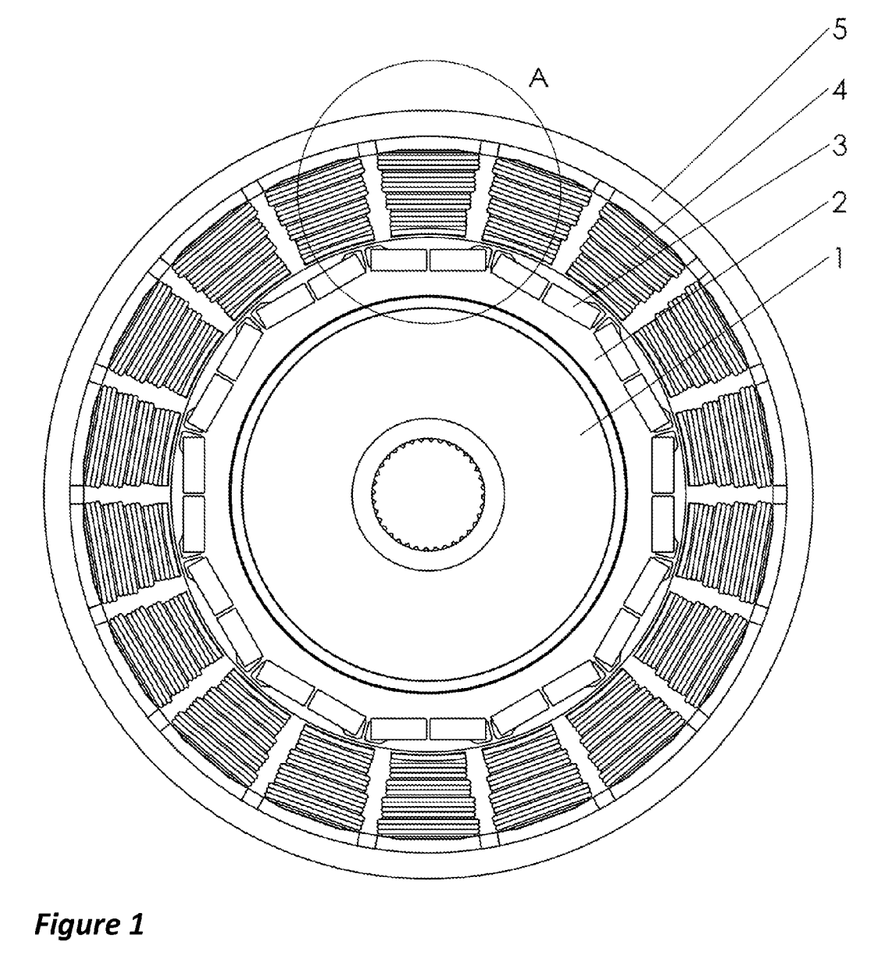
FIG. 1 is a front view of the electric motor, along the longitudinal axis in respect of the electric motor rotor (1). The figure further shows the marked: rotor stack (2) that consists of rotor laminations, randomly marked permanent magnet (3) and randomly marked winding (4) on the concerned stator stack tooth (5).
Figure 2:
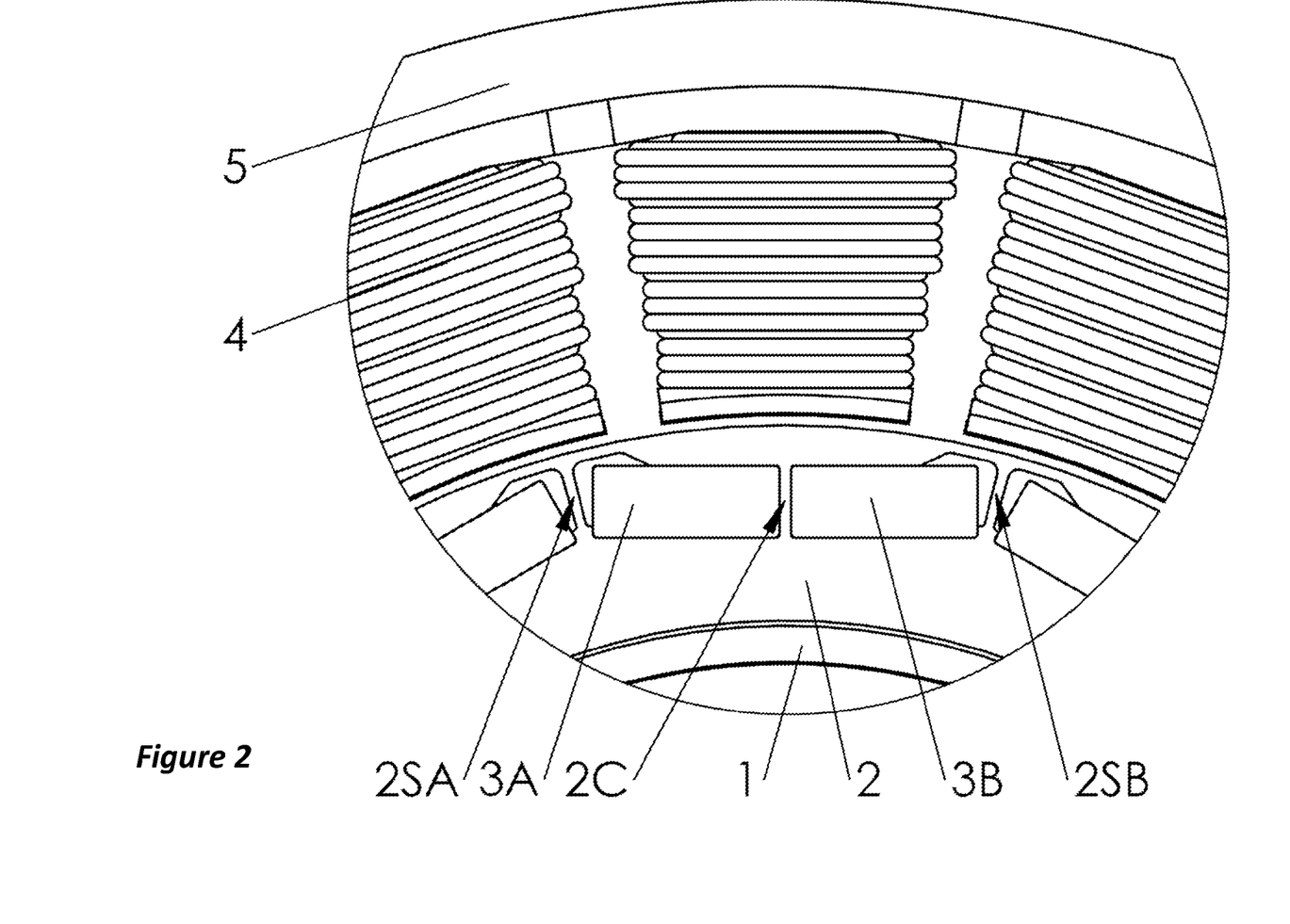
FIG. 2 shows a detailed view A from FIG. 1.
Figure 3:
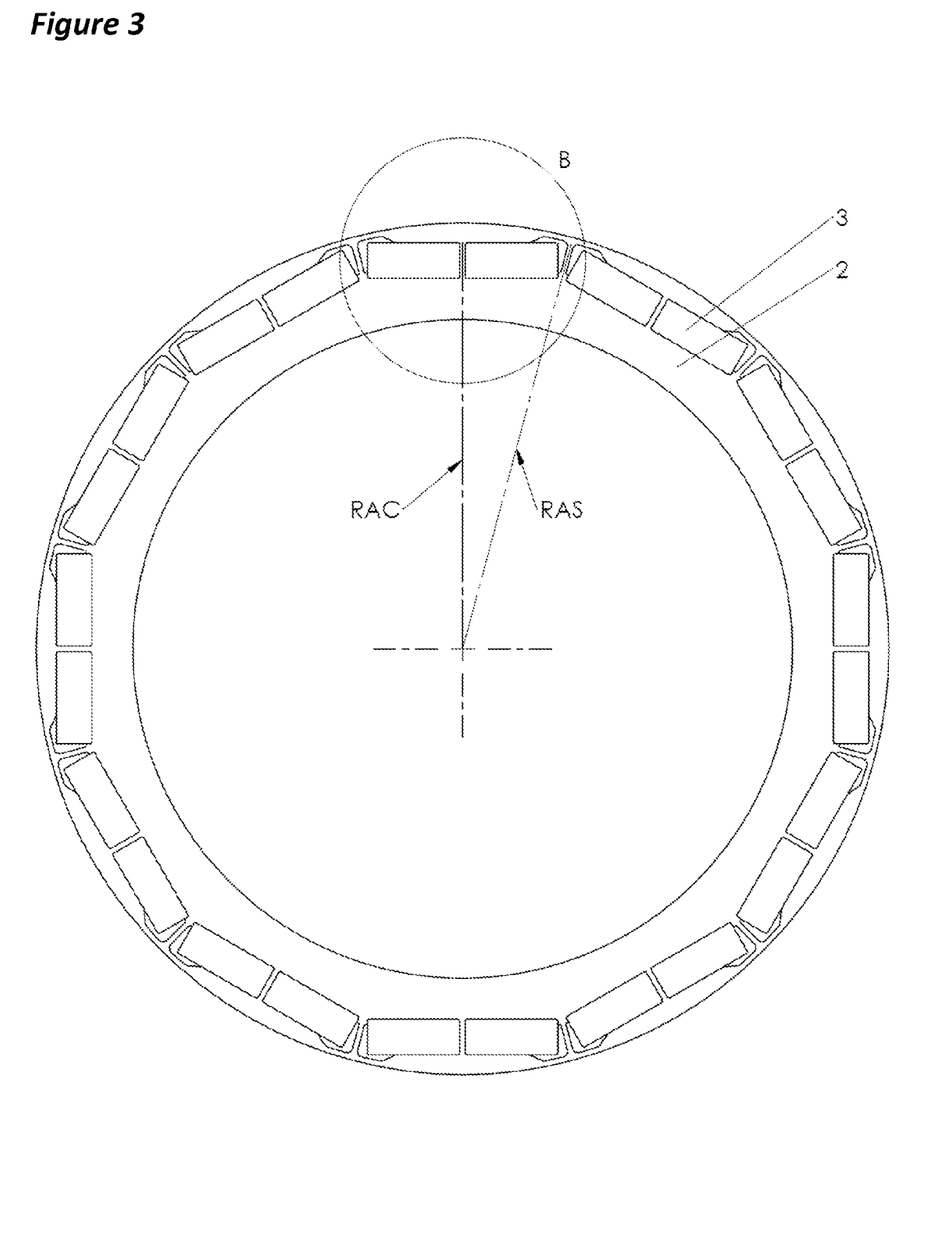
FIG. 3 shows the rotor stack (2) with installed permanent magnets (3), in which the previously shown electric motor elements are no longer marked for better clarity.
Figure 4:
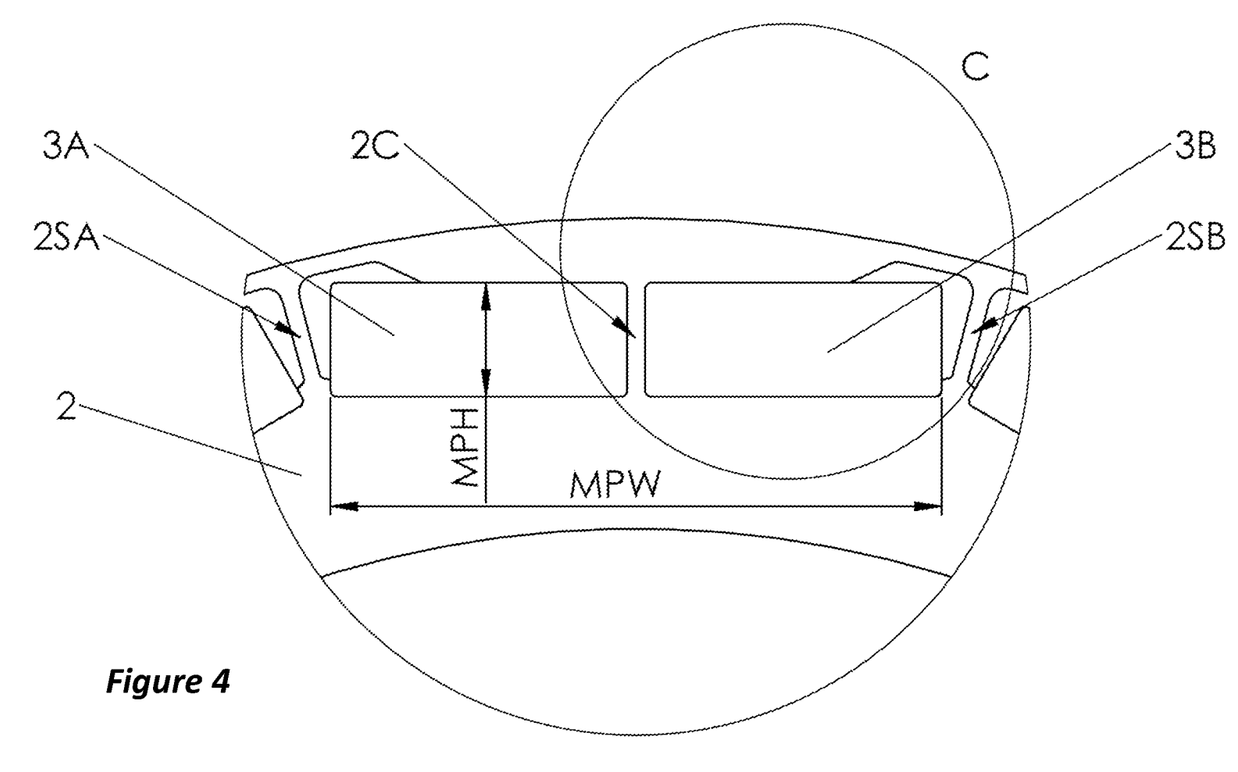
FIG. 4 shows a detailed B view, showing the marked: rotor stack (2), side connecting elements (2SA, 2SB), central connecting element (2C), a pair of permanent magnets (3A and 3B), the nominal height of the magnet gap (MPH) and width of the magnet pair (MPW) of an individual magnetic pole. Further, in FIG. 4 is designated the extent of a detailed C view.

The electric motor rotor (1), and/or more precisely the rotor stack (2) in the preferred embodiment comprises a bigger number of magnetic field poles, in which the permanent magnets (3) are placed inside the rotor stack (2). Due to the tendency to reach high rotational speeds and as much density of the magnetic field as possible, the rotor stack (2) comprises a higher number of permanent magnets (3), which are evenly arranged by the circumference of the rotor stack (2). By forming the gap, to which the permanent magnets (3) are installed, the rotor stack (2) is divided into internal part, which is put on the shaft and/or rotor holder (1) of the electric motor and the external part, which together with the teeth of the stator stack (5) form an air gap. In respect of the indicated, it often happens that the permanent magnets (3) in the rotor stack (2) are placed tightly one next to the other, for which the side connecting element (2S) and/or more precisely the width of the side connecting element (2S-T) becomes critically small in respect of the radial forces, which occur in higher rotational speeds and greater diameters of the rotor stack (2). In order to ensure mechanical stability of the rotor stack (2) in higher rotational speeds of the rotor (1), an individual gap of the magnetic pole in the preferred embodiment is divided in two symmetric parts, for which the permanent magnet of an individual pole is divided in two equal parts in the form of a permanent magnet pair (3A, 3B) as shown in FIG. 2. Thus, an individual gap of the rotor stack (2), to which a permanent magnet is installed, comprises—in the preferred embodiment—only one air barrier, which is preferentially made in the most outer corner of the gap for installation of the permanent magnet (3A, 3B).

The permanent magnet (3A, 3B) is in the preferred embodiment in the form of a cuboid, which has—for technological requirements and limitations—in the preferred embodiment the sides and/or the corners rounded by the radius of magnet corner rounding (RM). The segment of the rotor stack (2) comprises a through hole, which in principal presents all key characteristics of the gap for installation of the permanent magnet (3A, 3B), which occurs by placing the segments to the rotor stack (2). Thus, the rotor stack gap (2), to which the permanent magnets (3A, 3B) are installed, is in the preferred embodiment made as a polygon, which in its starting point concurs with the form and dimensions of a permanent magnet (3A, 3B), where the rotor stack gap (2) in the most outer corner of the permanent magnet (3A, 3B) further comprises an air barrier, which has a direct influence on the course and the form of the lines of the magnetic field.

Figure 5:
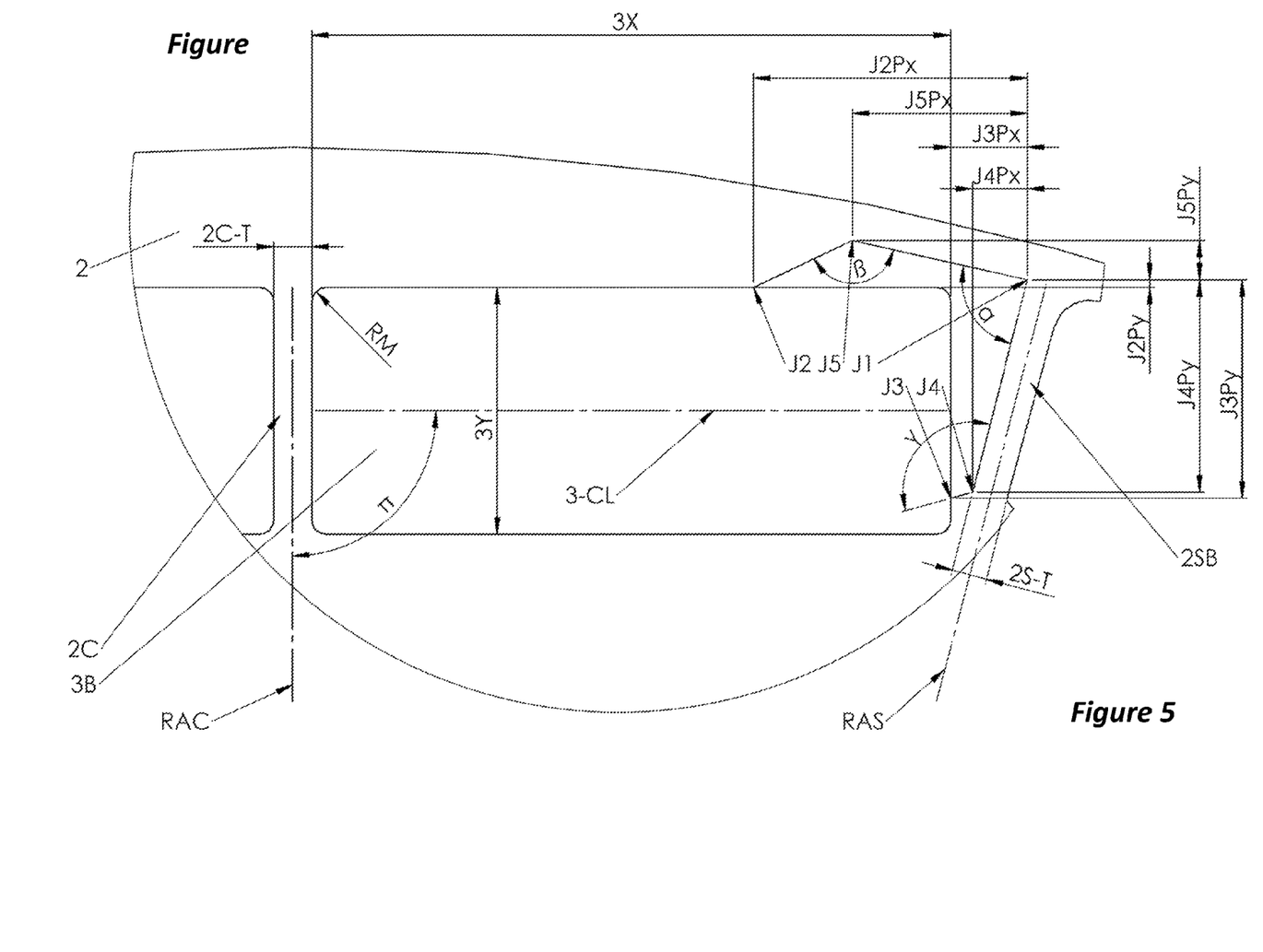
FIG. 5 shows a detailed C view with the marked: rotor stack (2), side connecting elements (2SB), central connecting elements (2C), one of the magnet pairs (3B), magnet height (3Y), magnet width (3X), width of the central connecting element (2C-T), width of the side connecting element (2S-T), plane of the central connecting element (RAC), plane of the side connecting element (RAS), contact points and/or corners of the air barrier (J1, J2, J3, J4 and J5), distances of contact points and/or corners of the air barrier in X direction (J2Px, J3Px, J4Px, J5Px), and distances of contact points and/or corners of the air barrier in Y direction (J2Py, J3Py, J4Py, J5Py), and the intermediate angles of the air barrier line segments ($\alpha$, $\beta$, $\gamma$). Further in FIG. 5 radius of the magnet corner rounding (RM), central magnet plane (3-CL) and magnet incline angle ($\pi$) in respect of the plane of the central connecting element (RAC) is marked.
Figure 6:
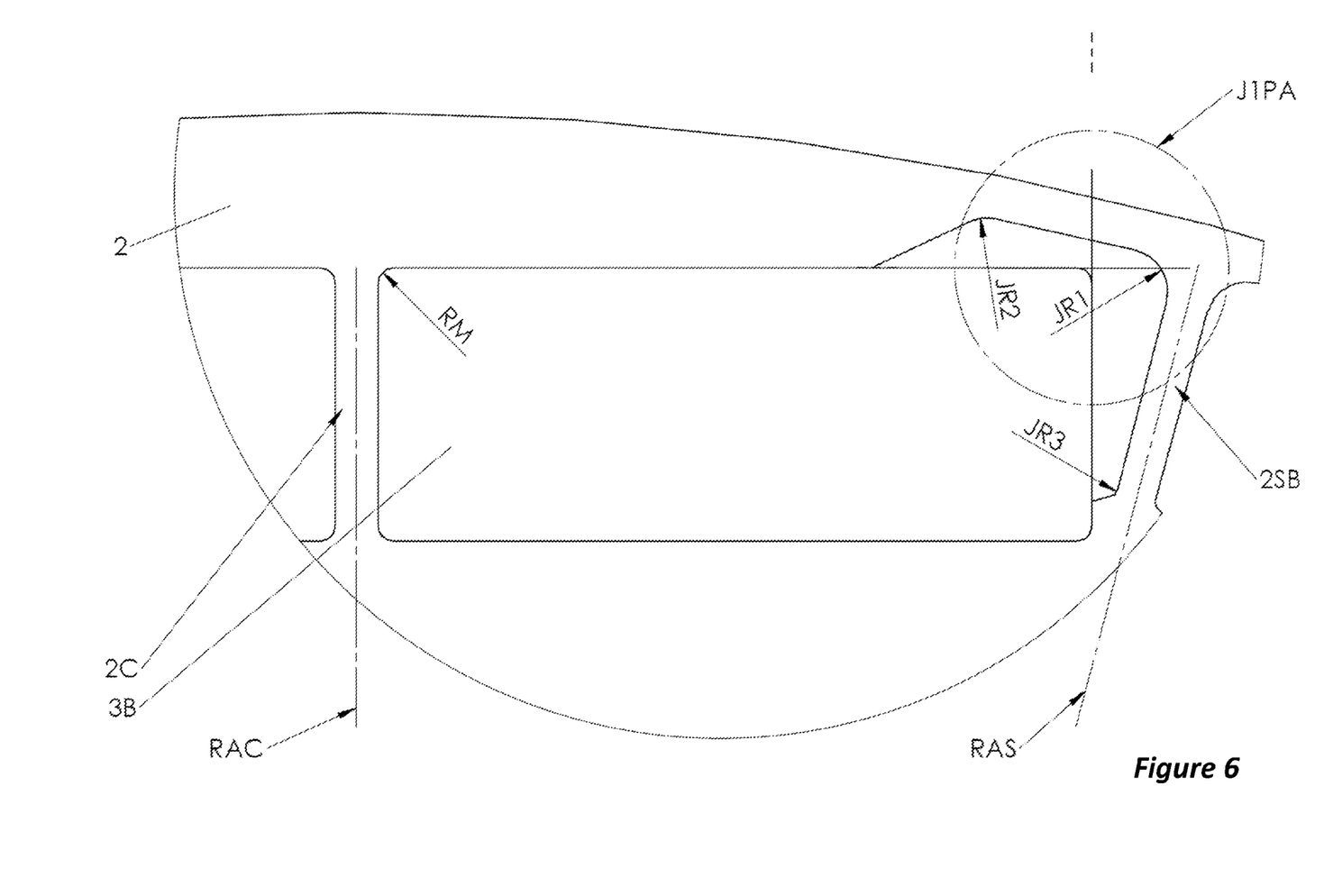
FIG. 6 shows a detailed C view, in which the corner line segments of the air barrier are rounded by rounding radii (JR1, JR2, JR3). Further.

In description of FIG. 5 it is worth noting that—for easier understanding and defining of key characteristics—the air barrier is subordinately adjusted and shown as a polygon, where—for easier marking—it does not show the rounding (JR1, JR4 and JR5) in the contact points (J1, J4 and J5), as it is shown and marked in the final form of the air barrier in FIG. 6. The air barrier in the basic construction comprises at least three corners and/or contact points (J1, J2, J3), where the first corner (J1) is the starting point of the air barrier in the form of a polygon with at least three corners (J1, J2, J3) where the corners (J2 and J3) present the contact points and/or the intersection with the permanent magnet surface (3A, 3B). The position of the starting and/or the contact point (J1) of the polygon of the air barrier is within the area of the circumference of the first point (J1PA), the centre of which is at the very outer corner, in the intersection of the magnet sides (3A, 3B) to be more precise, where the radius of the circumference of the first contact point (J1PA) amounts to half the height of the magnet (3Y). With regard to the starting contact point (J1), the position of other corners of the air barrier polygon (defined by the corners and/or the contact points J1, J2, J3 and J5) is further unidimensionally defined by the intermediate angles of the line segments of the air barrier (α, β, γ). If appropriate, the air barrier comprises a bigger number of corners, which can—instead of the line segments—make a curve in the form of a polygon composed of short segments, which however does not changes the essence of the invention. Here it is worth noting that an individual gap for installation of the magnet (3A, 3B) in the preferred embodiment comprises only one air barrier as explained before, in which every magnet pole and/or pair of the permanent magnets (3A, 3B) contains a central connecting element (2C), which connects the internal and outer part of the rotor stack (2).

Figure 7:
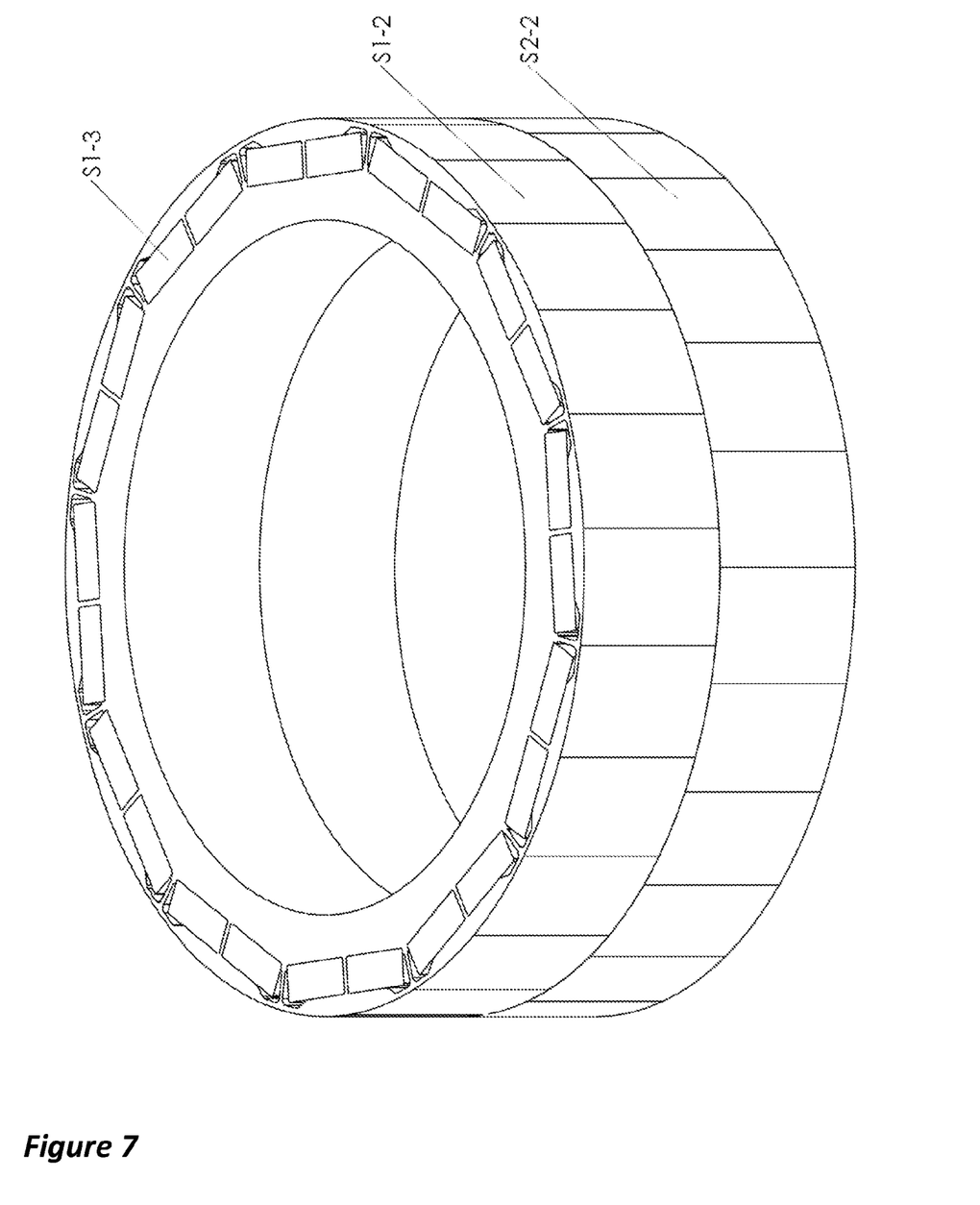
FIG. 7 shows assembly of the rotor stack (2) in the isometric view, which is composed of two concentric segments of the rotor stack (S1-2, S2-2), which are in respect of each other misaligned around the central axis.
Figure 8:
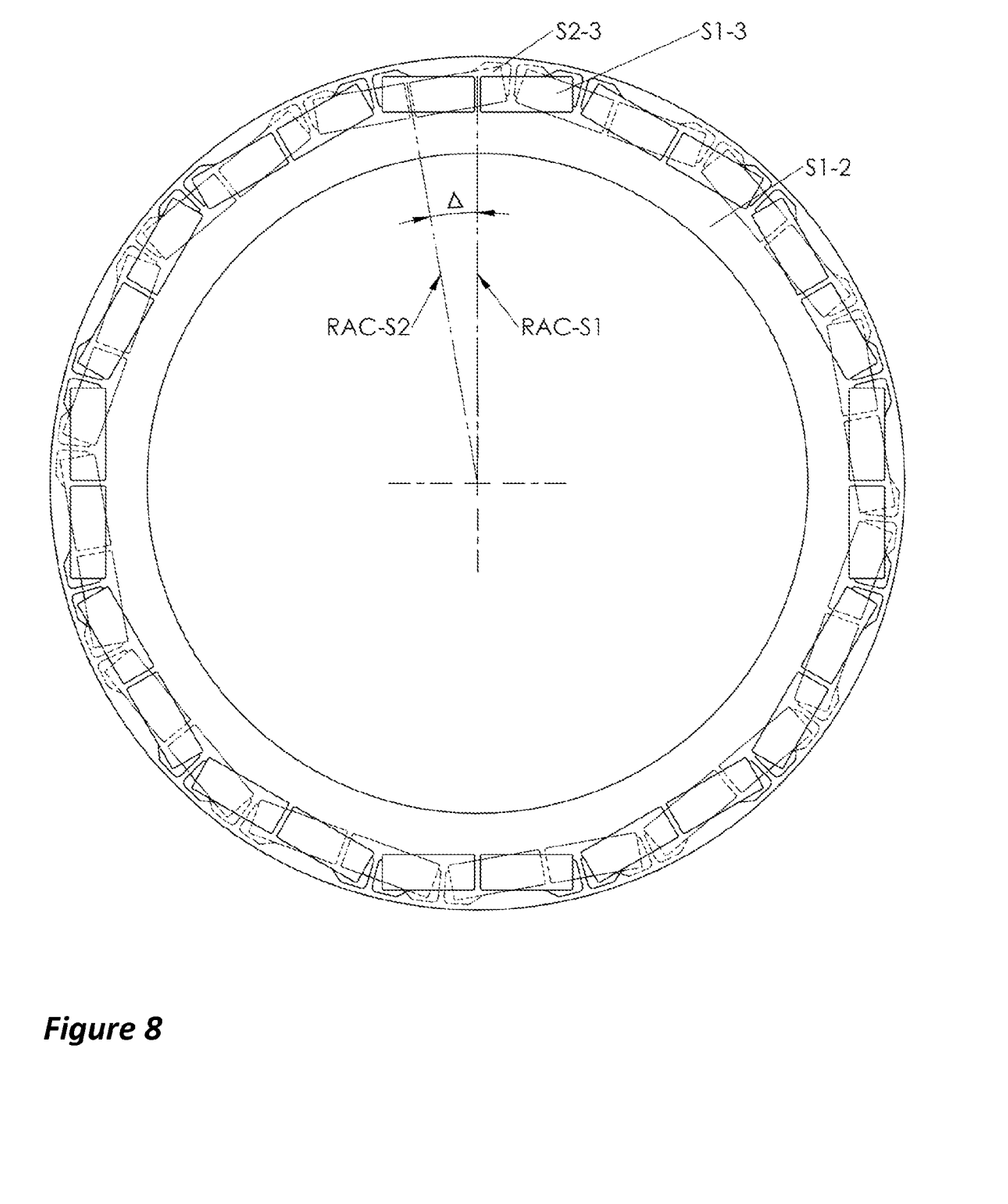
FIG. 8 shows front view of the rotor stack assembly (2), in which the figure is shown in the wire model, which means that the invisible edges are shown with the hatched line.

To understand the solution of this patent application, it is further important to draw attention to the rotor (1), which can comprise a bigger number of rotor stacks and/or segments (S1-2, S2-2), which are aligned around the central axis. In the preferred embodiment the rotor (1) comprises two segments (S1-2, S2-2), which are misaligned in respect of the central axis by the misalignment angle of the neighbouring segments of the rotor stack (A), which is in the preferred embodiment between 0.5° and 20°.

To define the area of relevant constructions of air barriers, the limit values are given hereinafter in the patent application, more exactly in FIGS. 5 and 6 of the used characteristic dimensions and/or parameters.

In this sense, the absolute value of the gap between individual contact points in respect of the starting contact point (J1) in X direction (J2Px, J3Px, J4Px, JSPx) and or the value of the gap between individual contact points regarding the starting point (J1) in Y direction (J2Py, J3Py, J4Py, JpSY) is smaller than 3 times the nominal height of the magnet gap (MPH). Similarly applies for the intermediate angles of the air barrier line segments (α, β, γ), which are between 30° and 170°. The minimal width of the central connecting element (2C-T) and the minimal width of the side connecting element (2S-T) are in the preferred embodiment smaller than 0.2 times the magnet width (3X). The angle of the magnet tilt (it) regarding the plane of the central connecting element (RAC) is in the range between 45° and 135°, and is preferably 90°. The rounding radii (JR1, JR2 in JR3) and the radius of magnet corner rounding (RM) are smaller than 0.5 times the height of the magnet (3Y).

It is understood that an expert in this field can achieve similar results on the basis of the record by changing the values of the given technological parameters of the method for manufacture and/or design of a barrier within the gap for insertion of the permanent magnets (3A, 3B) of the rotor stack (2), by which it does not circumvent the following patent claims.

The invention claimed is:

1. A rotor stack of an electric motor, comprising:
a plurality of segments and at least two permanent magnets of an individual magnet pole, wherein the plurality of segments, in an axial direction with respect to a rotor rotation side, define an individual gap for insertion of the at least two permanent magnets of the individual magnet pole;
wherein each of the at least two permanent magnets is configured as a cuboid;
wherein the individual gap of the magnet pole has a form and dimension to receive the at least two permanent magnets;
wherein the individual gap further includes at least one central connecting element and at least two side connecting elements, which mechanically connect an inner part and an outer part of the rotor stack, so that the at least two side connecting elements define a respective air barrier configured as a polygon;
wherein the respective air barrier in an outer corner of the individual gap extends to at least two sides of a respective one of the at least two permanent magnets; and
wherein a width of the at least one central connecting element and a width of the at least two side connecting elements are smaller than 0.2 times a magnet width.

2. The rotor stack of claim 1, wherein the respective air barrier includes at least three contact points, and wherein at least two contact points of the at least three contact points, with respect to the axial direction, represent an intersection of the respective air barrier with a surface of the at least two permanent magnets, and the other contact point of the at least three contact points represents a starting contact point of the respective air barrier.

3. The rotor stack of claim 2, wherein the starting contact point is disposed within an area of a circumference of a first contact point, the first contact point having a centre that is in an outermost corner of the respective one of the at least two permanent magnets, and wherein a radius defined by the area within the circumference of the first contact point is at least one of smaller than and the same as half a value of a magnet height.

4. The rotor stack of claim 3, wherein the at least three contact points of the respective air barrier are connected with one another via line segments, and wherein the starting contact point defines an intermediate angle of line segments.

5. The rotor stack of claim 4, wherein the intermediate angle is within the range between 30° and 170°.

6. The rotor stack of claim 1, wherein the respective air barrier includes five contact points, and wherein said five contact points are defined by, with respect to a starting point, a distance of said five contact points in an X direction and a distance of said five contact points in a Y direction, in which said five contact points are connected to one another via line segments that intersect to form intermediate angles.

7. The rotor stack of claim 6, wherein said intermediate angles are between 30° and 170°.

8. The rotor stack of claim 6, wherein at least one of a value of the distance between neighbouring contact points in respect of the starting contact point in the X direction and a value of the distance between individual contact points regarding the starting contact point in the Y direction is smaller than three times a nominal height of the individual gap.

9. The rotor stack of claim 1, wherein the at least two permanent magnets in the individual gap form an angle of a magnet tilt.

10. The rotor stack of claim 9, wherein a value of said angle of the magnetic tilt is, with respect to a plane of the at least one central connecting element, within the range between 45° and 135°.

11. The rotor stack of claim 9, wherein the angle of the magnetic tilt is 90°.

12. The rotor stack of claim 1, wherein the respective air barrier includes a plurality of contact points connected among each other by rounding radii, and wherein said rounding radii have a value which is smaller than 0.5 of a magnet height.

13. The rotor stack of claim 1, further comprising at least two rotor stack segments, wherein the at least two rotor stack segments are misaligned with respect to each other around a central axis by an angle of misalignment.

14. The rotor stack of claim 13, wherein said angle of misalignment is between 0.5° and 20°.

15. The rotor stack of claim 13, wherein the angle of misalignment is 5°.

16. The rotor stack of claim 14, wherein said angle of misalignment is 5°.

17. An electric motor, comprising:
at least one rotor stack including a plurality of segments defining a gap in an axial direction with respect to a rotation axis;
at least two permanent magnets of an individual magnet pole insertable into the gap, wherein each of the at least two permanent magnets is configured as a cuboid;
wherein the gap includes at least one central connecting element and at least two side connecting elements, which mechanically connect an inner part and an outer part of the at least one rotor stack, so that the at least two side connecting elements define an air barrier having a polygon configuration;
wherein the air barrier in an outer corner of the gap extends to at least two sides of a respective one of the at least two permanent magnets; and
wherein a width of the at least one central connecting element and a width of the at least two side connecting elements are smaller than 0.2 times a magnet width.

18. The electric motor of claim 17, wherein the at least one rotor stack is a first rotor stack, and further comprising a second rotor stack arranged misaligned with respect to the first rotor stack about the rotation axis by an angle of misalignment.

19. The electric motor of claim 18, wherein the angle of misalignment is between 0.5° and 20°.

20. The electric motor of claim 19, wherein the angle of misalignment is 5°.

* * * * *